United States Patent
Crussol

(10) Patent No.: US 7,983,991 B2
(45) Date of Patent: Jul. 19, 2011

(54) METHOD FOR A UNIQUE CERTIFICATION PROCESS FOR THE DELIVERY OF GOODS

(75) Inventor: Sebastien Crussol, Nevers (FR)

(73) Assignee: Cards Off S.A., Paris (FR)

( * ) Notice: Subject to any disclaimer, the term of this patent is extended or adjusted under 35 U.S.C. 154(b) by 355 days.

(21) Appl. No.: 12/163,691

(22) Filed: Jun. 27, 2008

(65) Prior Publication Data

US 2009/0327136 A1     Dec. 31, 2009

(51) Int. Cl.
    *G06Q 20/00*     (2006.01)
    *G06Q 30/00*     (2006.01)

(52) U.S. Cl. ............................................ 705/63; 705/26
(58) Field of Classification Search .................. 705/63
See application file for complete search history.

(56) References Cited

U.S. PATENT DOCUMENTS

| 6,223,166 B1 * | 4/2001 | Kay ............................... 705/26 |
| 6,404,337 B1 * | 6/2002 | Van Till et al. ................ 340/569 |
| 6,536,659 B1 * | 3/2003 | Hauser et al. ................. 235/375 |
| 2002/0156645 A1 * | 10/2002 | Hansen ............................. 705/1 |
| 2009/0179735 A1 * | 7/2009 | Van Rysselberghe ....... 340/5.73 |

* cited by examiner

*Primary Examiner* — Calvin L Hewitt, II
*Assistant Examiner* — Zeshan Qayyum
(74) *Attorney, Agent, or Firm* — Osha • Liang LLP

(57) ABSTRACT

A method for a secure delivery of physical goods, involving associating a good unique identifier (GUID) to a package comprising the physical goods requested by a client, obtaining proof of identity parameters from a client associated with the transaction involving the physical goods before the delivery of the physical goods, where the proof of identity parameters are provided to the client by a trusted authority, computing a function using the proof of identity parameters, the GUID, and a certification key, wherein the certification key is computed by the trusted authority, delivering the physical goods to the client, when the result of the function is positive, certifying the delivery when delivery data obtained during the delivery of the physical goods match the proof of identity parameters, the GUID, and the certification key known to the trusted authority.

10 Claims, 5 Drawing Sheets

METHOD FOR A UNIQUE CERTIFICATION PROCESS FOR THE DELIVERY OF GOODS

BACKGROUND

Objects that are shipped, delivered, sent, or otherwise exchanged from one geographic location to another geographic location need to be protected from damage, theft, etc. Particularly, objects of high value or importance need to be protected from theft during the time that the high value objects travel from one geographic location to another. Objects may include packages, containers, documents, food sacks being delivered in a disaster relief effort, or any other item that may be sent/delivered in shipments or groups. In many cases, protecting a shipment of objects is difficult as it is not always possible to watch over the shipment. A group of objects may be unattended, resting on an airport tarmac, or waiting on a loading dock for a truck, for example.

Typically, the delivery process involves the deliveryman picking up the physical good at the warehouse or other type of storage location. On the package, a document describes the delivery address and the name of the client to receive the package. Once at the right address, the deliveryman typically requests to see or speak to the client whose name is on the package. The client may be required to show some type of identification. Upon proof of identity, the client signs off on the delivery document, and the package is delivered to the client. Upon completion of delivery, the deliveryman sends delivery proof documents to the merchant.

SUMMARY

Figure 1:
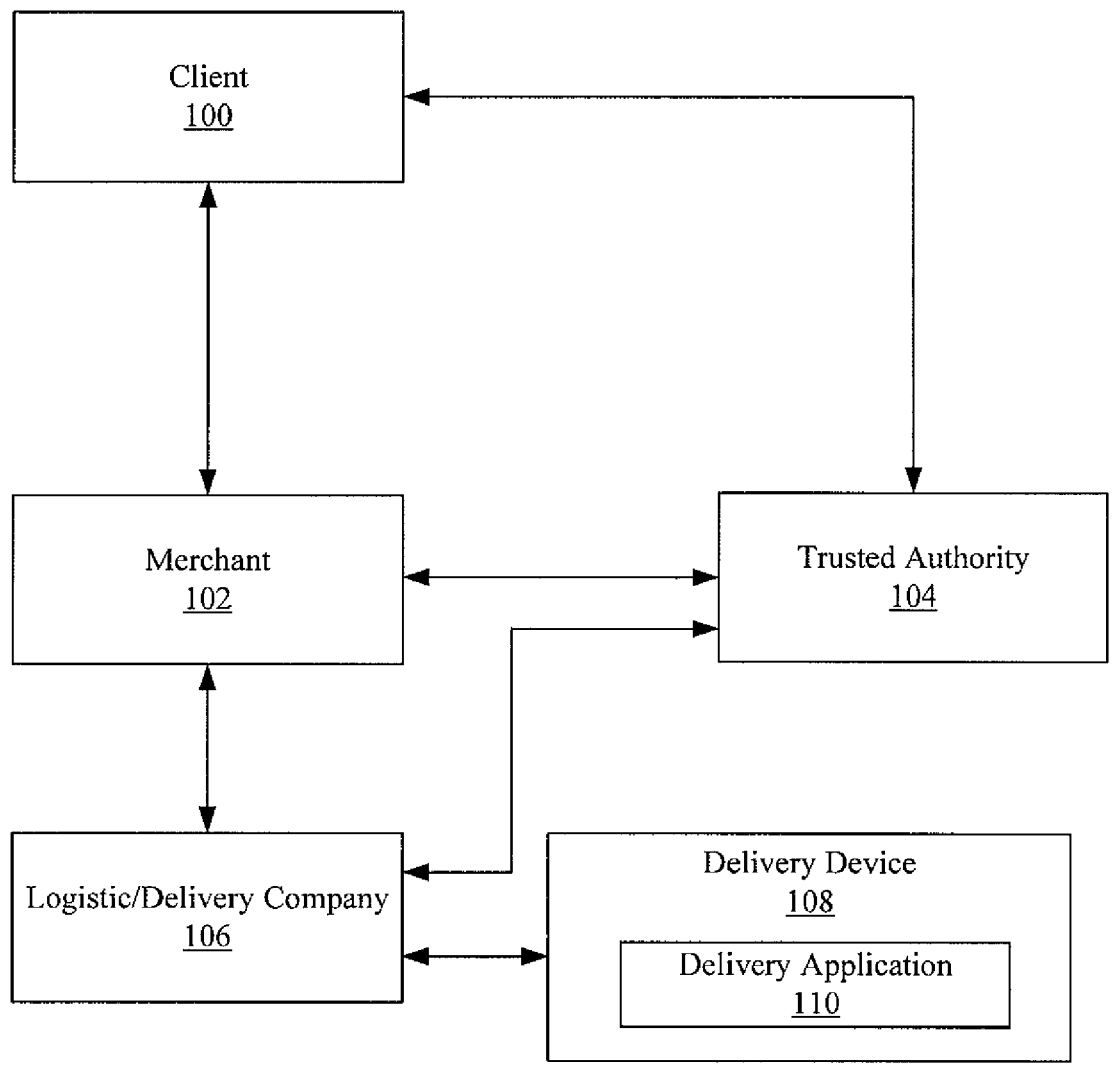
FIG. 1 shows a system in accordance with one or more embodiments of the invention.

In general, in one aspect, the invention relates to a method for a secure delivery of physical goods, comprising associating a good unique identifier (GUID) to a package comprising the physical goods requested by a client, obtaining proof of identity parameters from a client associated with the transaction involving the physical goods before the delivery of the physical goods, wherein the proof of identity parameters are provided to the client by a trusted authority, computing a function using the proof of identity parameters, the GUID, and a certification key, wherein the certification key is computed by the trusted authority, delivering the physical goods to the client, when the result of the function is positive, certifying the delivery when delivery data obtained during the delivery of the physical goods match the proof of identity parameters, the GUID, and the certification key known to the trusted authority.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method for a unique certification process for the delivery of physical goods from one geographic location to another. More specifically, embodiments of the invention provide a process for protecting a physical shipment of goods from being delivered to an incorrect client or being stolen in transit.

FIG. 1 shows a delivery system in accordance with one or more embodiments of the invention. Particularly, the delivery system includes a client (100), a merchant (102), a trusted authority (104), a logistic/delivery company (106), and a delivery device (108). Each of the aforementioned components of the delivery system are described in detail below.

The client (100) may be any entity (e.g., an individual, a business, a group of individuals, etc.) that requests physical goods from the merchant (102). For example, a client, using a computing device (e.g., a mobile phone, a PDA, a media device, a computer system, a laptop, etc.), may enter into an e-commerce transaction and purchase/order physical goods that are to be delivered to the client's physical location. In this case, the client would be purchasing/ordering physical goods from a merchant site (e.g., a web site). Alternatively, a client may request physical goods by physically going into a merchant store. Thus, the client and the merchant (102) directly interact for the request of physical goods.

The trusted authority (104) is a neutral third-party entity that provides certification for a correct delivery and declares a delivery uncertified if the delivery is incorrect. In one or more embodiments of the invention, the trusted authority (104) is configured to provide the delivery device with the delivery application (110). In addition, in one or more embodiments of the invention, the trusted authority (104) is responsible for distributing unique identifiers to the merchant (102) and the client (100). For example, the trusted authority (104) provides the merchant with a good unique identifier (GUID) and provides the client with a client unique key (CUK) and a transaction unique identifier (TUI) identifying the specific commercial transaction through which the client requests the physical goods. In addition, in one or more embodiments of the invention, the trusted authority (104) generates a certification key, which is a specific code that is associated with each delivery.

The GUID is a unique identifier that is associated with the physical goods to be delivered. The GUID may be a parcel number, a pick up number, or any reference shared between the logistic/delivery company, the trusted authority, and the merchant of the physical goods. In one or more embodiments of the invention, the GUID is a barcode placed on the package to be delivered. Alternatively, the GUID may be implemented as an RFID tag placed on or inside the package of goods, or any other suitable readable tag, such as a 2D tag.

The CUK is issued/granted to the client before any secured transaction for the request of physical goods occurs. The CUK is a one-to-many key that may be stored on a read-only device. Further, in one or more embodiments of the invention, the CUK is a unique 10-digit number. In one or more embodiments of the invention, the CUK may be an RFID tag, a USB storage key, a mobile phone embedded near field communication tag, or any other type of device incorporating contactless communication capability, and/or any combination thereof. Those skilled in the art will appreciate that a client may be provided with more than one CUK and/or CUK device. For example, the client may wish to authorize one or more family members to receive a shipment of physical goods on behalf of the client, in which case more than one CUK device may be given to each authorized family member of the client.

In one or more embodiments of the invention, the TUI is a random, four-digit number that is generated by the trust authority and issued to the client when the commercial transaction through which the client requests physical goods takes place. This random number is unique to each delivery associated with each transaction involving the purchase/request of physical goods. For example, the TUI may be associated with any commerce transaction entered into by the client for physical goods. In one or more embodiments of the invention, the TUI is communicated to the client before delivery takes place via a separate media, such as telephone, e-mail, text message, etc. The CUK and the TUI are collectively referred to as proof of identity parameters presented by the client to the deliveryman.

The certification key is a specific code that is calculated by the trusted authority (104) and loaded onto the delivery device (110) before delivery. The certification key is computed as:

$$f[periodic\_version\_number, GUID, CUK, TUI] = \text{Certification key}.$$

In one or more embodiments of the invention, the function f is an asymmetric function so that known combinations of the GUID and the certification key cannot yield the CUK or the TUI values. Further, the outcome of the function f is regularly made different with a change to the periodic_version_number, which is done by the trusted authority (104). In one or more embodiments of the invention, the function f is kept secret and is only known by the trusted authority.

Those skilled in the art will appreciate that while embodiments of the invention are implemented with the CUK being ten digits and the TUI being four-digits, the aforementioned unique identifiers may be any number of digits in length. Further, those skilled in the art will appreciate that the trusted authority (104) may be any entity, such as a company, an individual, a group of individuals, an Internet application, or any other service that is a secure and neutral third-party to the delivery transaction. In addition, the trusted authority may be associated with approved suppliers, where the approved suppliers provide one or more of the above unique identifiers associated with the delivery transaction.

The logistic/delivery company (106) is configured to obtain the requested physical goods from the merchant (102). Further, the logistic/delivery company (106) is configured to provide the delivery device (108) and the deliveryman with the necessary information to deliver the physical goods to the client (100). For example, the logistic/delivery company (106) provides the delivery device (108) with a list of the clients to which a shipment of physical goods is to be delivered. The list of clients includes the clients' necessary information, such as the client's contact numbers, physical address, and name. The delivery device (108) may be any wireless, portable device which the deliveryman carries with him/her. For example, the delivery device (108) may be a mobile phone, a PDA, a gaming device, a portable terminal, or any other suitable device for storing delivery information and the delivery application (110).

In one or more embodiments of the invention, the deliveryman's delivery device (108) is modified to download and store the delivery application (110). The delivery application is configured to perform mathematical computations for verifying whether the delivery has occurred at the correct physical location and the person presented to the deliveryman for acceptance of the physical goods package is in face the correct client. More generally, the delivery application challenges the consistency of the unique identifiers and parameters associated with the delivery.

Figure 2:
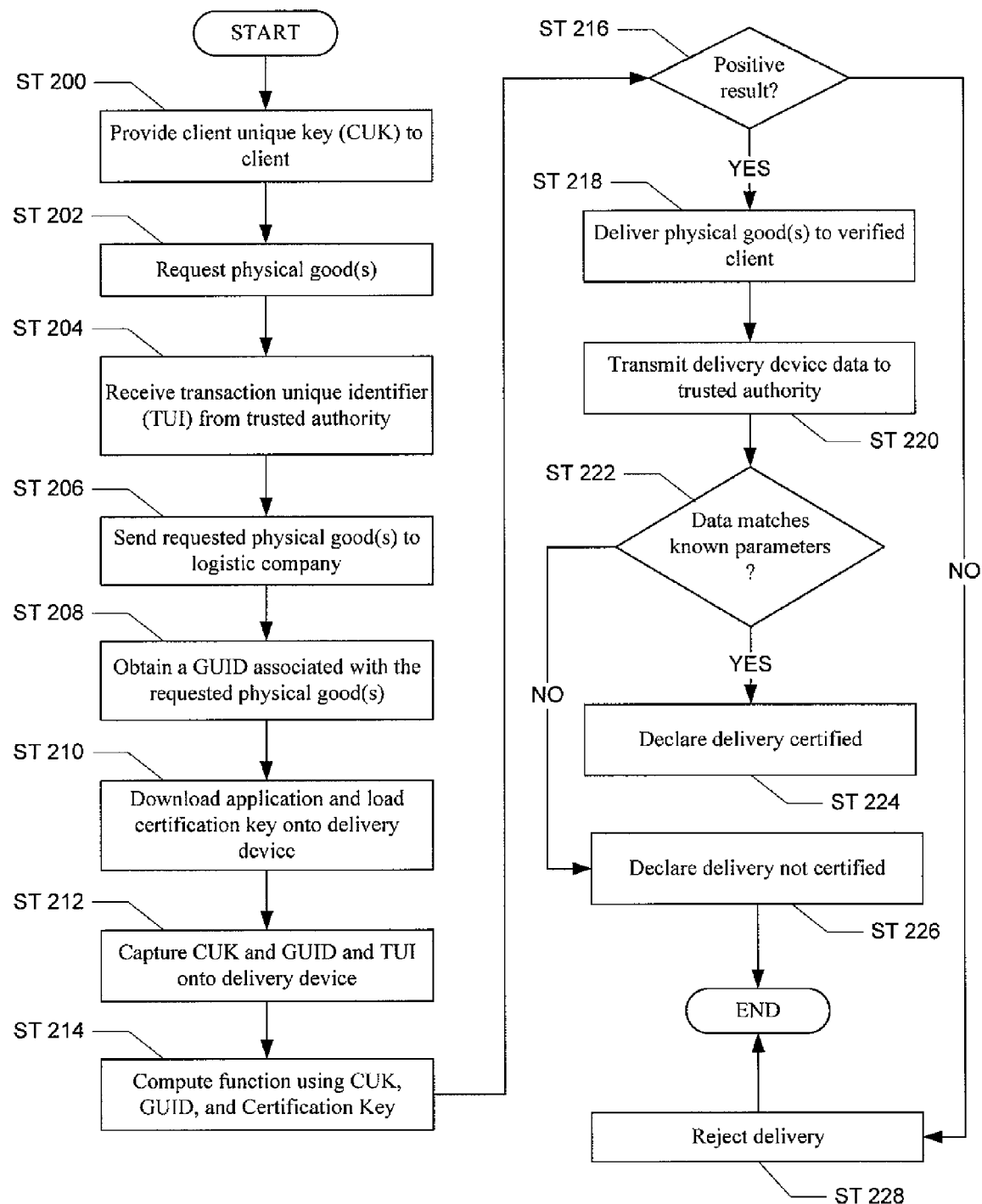
FIG. 2 shows a flow chart in accordance with one or more embodiments of the invention.

FIG. 2 shows a flow chart for a secure delivery process in accordance with one or more embodiments of the invention. Initially, the client is provided a CUK (ST 200). Subsequently, the client, via some type of commercial transaction (e.g., e-commerce transaction, a physical transaction at a merchant store, etc.) requests the delivery of physical goods (ST 202). For example, the client may purchase physical goods online at a merchant site. During the commercial transaction, the client is issued a TUI (ST 204). At this stage, the requested physical goods are sent from the merchant to the logistic/delivery company (ST 206). When this transfer of physical goods occurs, the merchant receives a GUID that is associated with the requested physical goods (ST 208). Alternatively, in one or more embodiments of the invention, the merchant may generate the GUID and associate the physical goods with the GUID on their end. Those skilled in the art will appreciate that the GUID may be an identifier obtained from the typical supply chain, and may not be an identifier that is uniquely generated by the merchant. Before the delivery route begins, the logistic/delivery company downloads the list of goods to be delivered and other logistic information necessary for delivery onto the delivery device. In addition, the delivery application and the specific code, i.e., the certification key associated with each delivery, is loaded onto the delivery device (ST 210).

The next stage of the process occurs at the client's physical location, when the deliveryman arrives to deliver the shipment of goods. Before the delivery takes place, the deliveryman must verify that the client is actually the authorized person to receive the shipment of goods, and that the physical goods match what the client ordered/requested. To verify the aforementioned information, the deliveryman uses the delivery device to capture the CUK, the TUI, and the GUID (ST 212). In one or more embodiments of the invention, the deliveryman captures the QUID by scanning a barcode on the package containing the physical goods. The TUI is captured onto the delivery device when the client inputs the TUI using a keypad or a virtual keyboard on the delivery device. As described above, the CUK may be stored on a read-only device in the possession of the client. The device containing the CUK may be connected to the delivery device (e.g., either wirelessly using infrared or Bluetooth technology, or using a wire such as a USB cable) and the CUK may be read from the CUK device by the delivery device.

Those skilled in the art will appreciate that the aforementioned description of how the CUK, TUI, and GUID are captured by the delivery device are merely examples, and is not meant to limit the invention in any way. The unique identifiers may be captured by the delivery device in any number of ways known in the art, or using any combination of the above-described methods.

Continuing with FIG. 2, once the various unique identifiers are captured, the delivery application loaded onto the delivery device computes one or more mathematical functions using the unique identifiers (ST 214). More specifically, the function computed by the delivery application is represented by:

$$h[certification\_key, GUID, CUK, TUI] = OK \text{ or } KO,$$

i.e., a hash of the certification key, the GUID, the CUK, and the TUI. At this stage, a decision is made as to whether the result of the computed hash function is positive or negative (ST 214), where the result OK allows the delivery of the physical goods (ST 218), and the result KO prevents the delivery of the physical goods (i.e., the delivery is rejected) (ST 228). The function is computed on the delivery device during the delivery process. If the delivery is rejected, the process ends. Alternatively, if the delivery is permitted, then the client receives the package of physical goods, and the data on the delivery device, including the result of the computed hash function, the GUID, and the TUI provided by the client, is sent to the trusted authority (ST 220). Upon receiving the delivery data from the delivery device, the trusted authority compares the data to the known parameters, i.e., the certification key, the CUK already known, and the TUI gathered during delivery. If the data matches the known parameters (ST 222), then the delivery is declared to be a certified delivery (ST 224). Alternatively, if the delivery data does not match the known parameters (ST 224), then the delivery is not marked as certified (ST 226), and the process ends.

Figure 3:
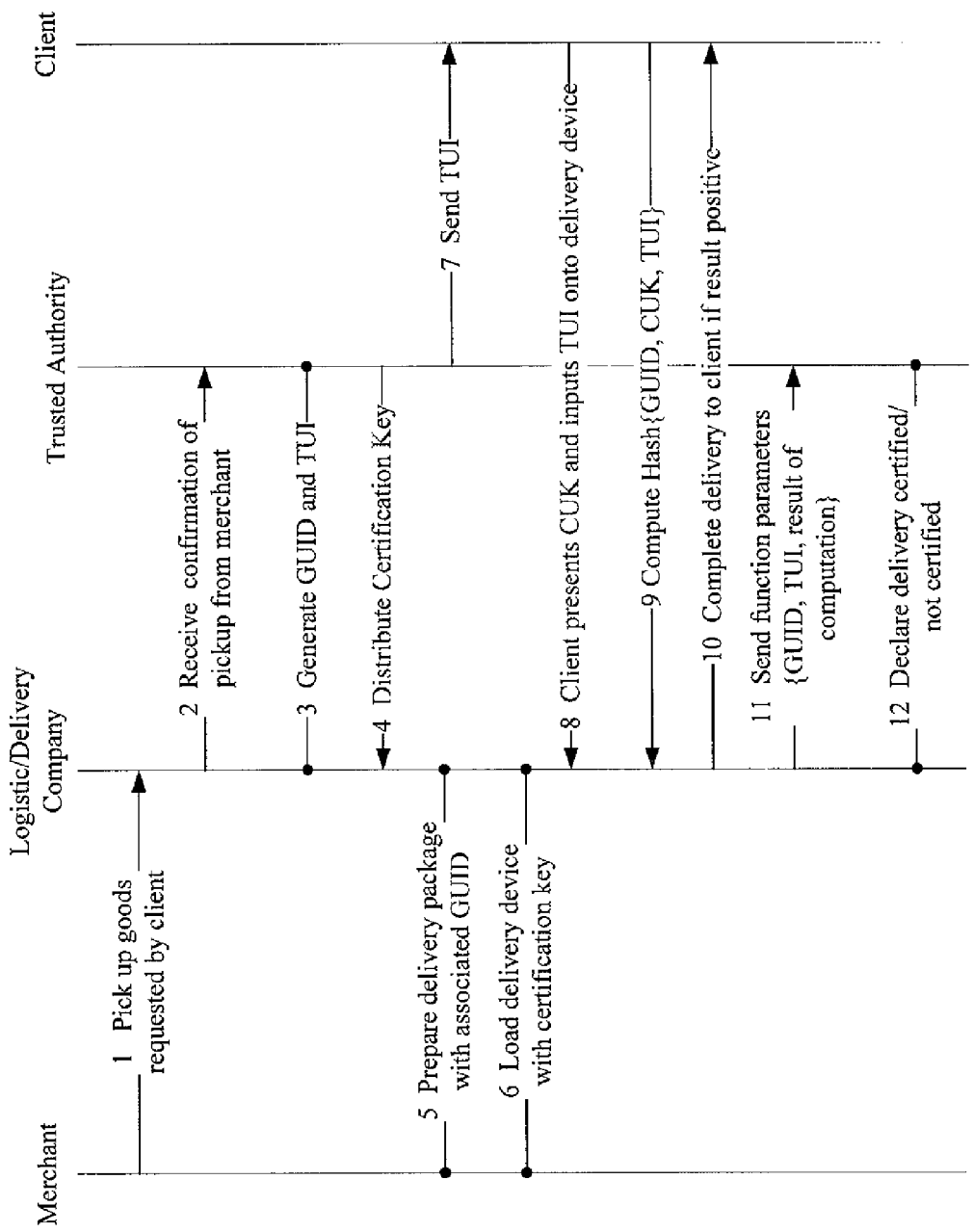
FIG. 3 shows a flow diagram in accordance with one or more embodiments of the invention.

FIG. 3 shows a flow diagram for a secure delivery process in accordance with one or more embodiments of the invention. More specifically, FIG. 3 shows the various entities involved in the delivery process, and the functions performed by each entity. In step 1, the logistic/delivery company picks up the goods requested by the client from the merchant. Next, the trusted authority receives confirmation from the logistic/delivery company of the pickup of the physical goods from the merchant (step 2). The trusted authority then generates (or in another embodiment, the merchant generates) a GUID for the package of physical goods, and the TUI to be provided to the client in association with the commercial transaction entered into by the client (step 3). The trusted authority also generates the certification key using the mathematical, asymmetrical function using the GUID, CUK, version number, and TUI as parameters. This certification key is distributed to the logistic/delivery company (step 4). The logistic/delivery company then prepares the package/parcel for delivery, and includes a barcode or other type of tag with the GUID associated with the package (step 5). The delivery device is subsequently loaded with delivery information, including the certification key (step 6). Meanwhile, the trusted authority sends the client a TUI (step 7).

During delivery, the client presents the CUK and inputs the TUI onto delivery device (step 8). The delivery device application computes the hash function using the unique identifiers (step 9) and sends the result and the unique identifiers to the trusted authority (step 11). Before the information is sent to the trusted authority, the delivery is made to the client, if the result of the hash function is positive (OK) (step 10). The trusted authority then declares the delivery of physical goods to the client certified or not certified (step 12).

Figures 4A, 4B, 4C, 4D:
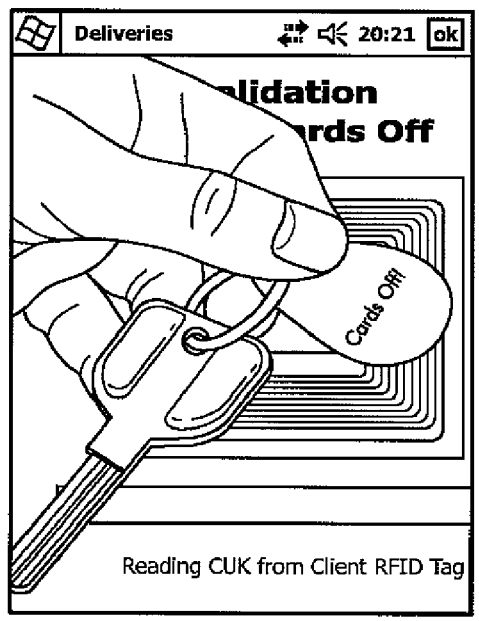
FIGS. 4A-4D show screen shots in accordance with one or more embodiments of the invention.

FIGS. 4A-4D represent screen shots of the delivery device interface in accordance with one or more embodiments of the invention. FIG. 4A shows the delivery device screen that displays the list of clients and corresponding client information for delivering packages. The screen shot of FIG. 4A displays the client name, the physical address location, and the number of packages to be delivered. FIG. 4B shows the scanning of the barcode from the delivery package to obtain the GUID onto the delivery device. FIG. 4C shows the input of the client CUK using a CUK device, such as an RFID tag as shown. Finally, FIG. 4D shows the input keypad for a client to enter the TUI onto the delivery device. Those skilled in the art will appreciate that the delivery device may also display images when the delivery is refused and/or accepted, and for other steps in the delivery process.

Figure 5:
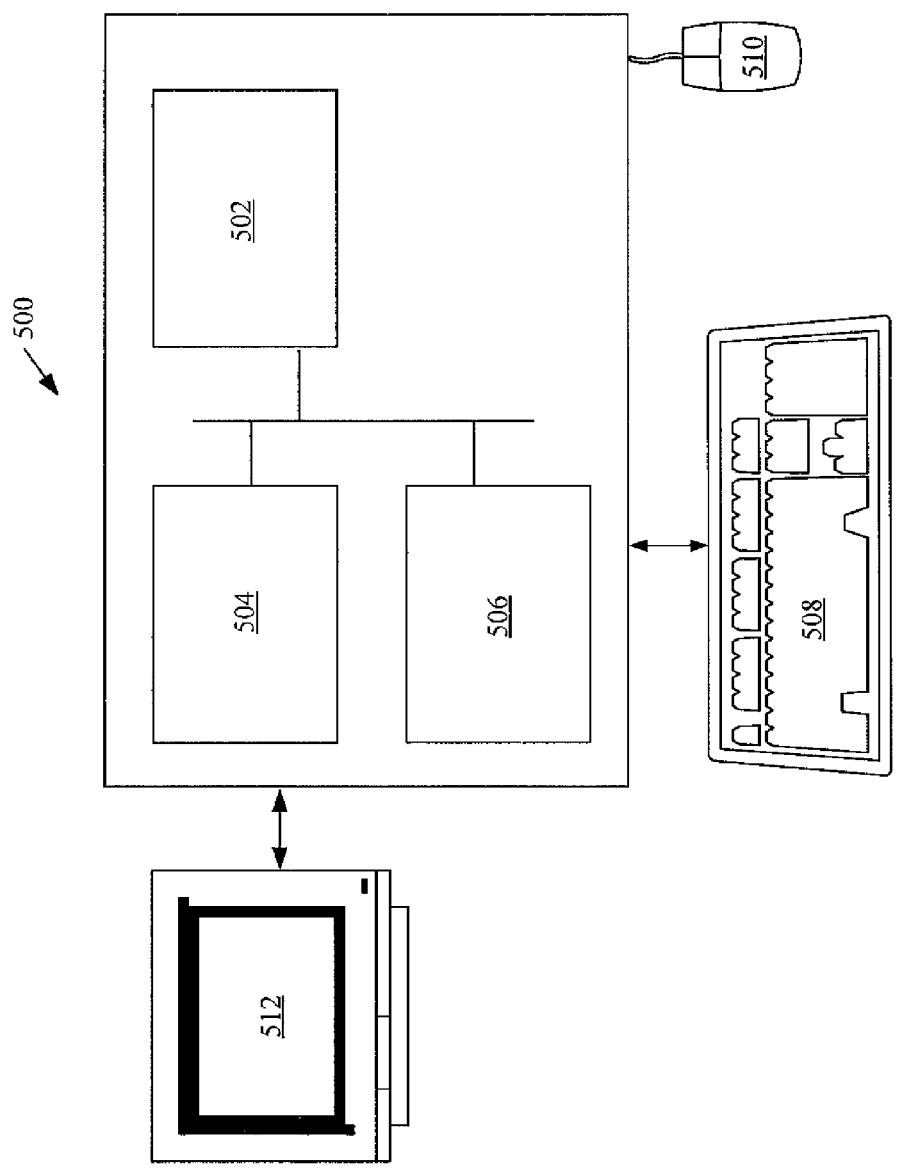
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms now known or later developed.

Further, software instructions to perform embodiments of the invention may be stored on a tangible computer readable medium such as a compact disc (CD), a diskette, a tape, or any other computer readable storage device, now known or later developed.

In one or more embodiments of the invention, a secure and verifiable method for delivering physical goods is provided. Further, the method for delivering physical goods significantly reduces logistic errors and frauds in the process of delivery. Advantageously, because the client must present proof of presence to the deliveryman using both the client unique key and the transaction unique identifier, the process of the present invention allows verification that the goods have been delivered to the right person and at the correct location. This process also assures that the deliveryman requests proof of identity from the client. Further, the delivery device, which includes the downloaded application for performing the necessary computations, frees the deliveryman from having to negotiate or bargain with the client in the event that there is a doubt of the proof of identity provided by the client. Use of the CUK and the TUI also reduces the problem of the client providing fake proofs of identity and the risk of device hacking.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for a secure delivery of physical goods, comprising:
   associating a good unique identifier (GUID) to a package comprising the physical goods requested by a client;
   obtaining proof of identity parameters from a client associated with the transaction involving the physical goods before the delivery of the physical goods, wherein the proof of identity parameters are provided to the client by a trusted authority;
   generating a certification key, by a trusted authority computing device comprising a processor;
   transmitting the certification key, by the trusted authority computing device, to a delivery device;
   storing the certification key by the delivery device;
   computing a function, by the delivery device comprising a processor, wherein the function is computed using the proof of identity parameters, the GUID, and the certification key;
   based on the computed function, displaying a positive result on the delivery device;

delivering the physical goods to the client, based on the computed function, displaying the positive result on the delivery device;

obtaining, by the trusted authority computing device, delivery data from the delivery device used to deliver the physical goods;

certifying, after delivery of the physical goods and by the trusted authority computing device the delivery based on the delivery data obtained during the delivery of the physical goods match the proof of identity parameters, the GUID, and the certification key known to the trusted authority.

2. The method of claim 1, wherein the function is computed by a delivery application stored on the delivery device.

3. The method of claim 2, wherein the function is a hash function of a client unique identifier, a transaction unique identifier, the GUID, and the certification key.

4. The method of claim 1, wherein obtaining proof of identity parameters from the client comprises:

obtaining a client unique identifier specifically identifying the client that requested the physical goods; and obtaining a transaction unique identifier associated with the transaction.

5. The method of claim 4, wherein the transaction unique identifier is input by the client using a keypad displayed on the delivery device.

6. The method of claim 4, wherein the client unique identifier is stored on a client device and is captured onto the delivery device from the client device.

7. The method of claim 6, wherein the client device is one selected from the group consisting of an RFID tag, a USB storage key, and a mobile phone embedded NFC tag.

8. The method of claim 1, wherein the delivery device comprises a list of clients and associated client information for each client that requests a delivery of physical goods.

9. The method of claim 1, wherein the certification key is computed by the trusted authority using the GUID, the proof of identity parameters, and a periodic version number, wherein the periodic version number is periodically modified to yield a changed result for the certification key.

10. The method of claim 1, wherein delivery data comprises the proof of identity parameters provided by the client, the GUID, and the result of the function.

* * * * *